(12) United States Patent
Zhao

(10) Patent No.: US 10,581,723 B2
(45) Date of Patent: Mar. 3, 2020

(54) PCEP EXTENSION FOR PCECC SUPPORT OF DISTRIBUTED COMPUTING, MULTIPLE SERVICES, AND INTER-DOMAIN ROUTING

(71) Applicant: Futurewei Technologies, Inc., Plano, TX (US)

(72) Inventor: Qianglin Quintin Zhao, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/474,708

(22) Filed: Mar. 30, 2017

(65) Prior Publication Data

US 2017/0289020 A1 Oct. 5, 2017

Related U.S. Application Data

(60) Provisional application No. 62/317,166, filed on Apr. 1, 2016, provisional application No. 62/317,159, filed
(Continued)

(51) Int. Cl.
*H04L 12/707* (2013.01)
*H04L 12/751* (2013.01)
(Continued)

(52) U.S. Cl.
CPC .......... *H04L 45/24* (2013.01); *H04L 45/02* (2013.01); *H04L 45/04* (2013.01); *H04L 45/42* (2013.01); *H04L 45/50* (2013.01); *H04L 45/74* (2013.01)

(58) Field of Classification Search
CPC ......... H04L 45/02; H04L 45/24; H04L 45/42; H04L 45/74; H04L 45/50
See application file for complete search history.

(56) References Cited

U.S. PATENT DOCUMENTS

2007/0189509 A1* 8/2007 Foody ................. H04L 67/2823
380/2
2008/0002664 A1* 1/2008 Li ............................ H04L 45/04
370/351
(Continued)

FOREIGN PATENT DOCUMENTS

CN 101083548 A 12/2007
CN 102308519 A 1/2012
(Continued)

OTHER PUBLICATIONS

King, D., Ed., et al., "The Application of the Path Computation Element Architecture to the Determination of a Sequence of Domains in MPLS and GMPLS," Network Working Group, draft-king-pce-hierarchy-fwk-06.txt, Apr. 18, 2011, 29 pages.
(Continued)

*Primary Examiner* — Redentor Pasia
(74) *Attorney, Agent, or Firm* — Conley Rose, P.C.

(57) ABSTRACT

A path computation element (PCE) central controller (PCECC) comprising a memory comprising executable instructions and a processor coupled to the memory and configured to execute the instructions. Executing the instructions causes the processor to receive a request to compute a path through a network, the request comprising a plurality of computational tasks, divide the computational tasks into a plurality of groups of computational tasks, transmit at least some of the plurality of groups of computational tasks to a plurality of path computation clients (PCCs) for computation by the PCCs, and receive, from the PCCs, computation results corresponding to the plurality of groups of computational tasks.

7 Claims, 8 Drawing Sheets

Related U.S. Application Data on Apr. 1, 2016, provisional application No. 62/317,163, filed on Apr. 1, 2016.

(51) Int. Cl.
  *H04L 12/723* (2013.01)
  *H04L 12/741* (2013.01)
  *H04L 12/717* (2013.01)
  *H04L 12/715* (2013.01)

(56) References Cited

U.S. PATENT DOCUMENTS

| | | | | |
|---|---|---|---|---|
| 2010/0208733 | A1* | 8/2010 | Zhao | H04L 12/185 370/390 |
| 2013/0329601 | A1 | 12/2013 | Yin et al. | |
| 2015/0103844 | A1* | 4/2015 | Zhao | H04L 45/42 370/410 |
| 2015/0215411 | A1* | 7/2015 | Andres | G08C 21/00 709/224 |
| 2015/0244607 | A1 | 8/2015 | Han | |
| 2015/0295820 | A1* | 10/2015 | Tang | H04L 45/50 370/351 |
| 2015/0350058 | A1* | 12/2015 | Wei | H04L 12/6418 709/242 |
| 2015/0372907 | A1* | 12/2015 | Korhonen | H04L 45/66 370/236 |
| 2016/0182381 | A1* | 6/2016 | Li | H04L 12/6418 370/235 |
| 2016/0277959 | A1* | 9/2016 | Venkataraman | H04L 45/125 |

FOREIGN PATENT DOCUMENTS

| | | |
|---|---|---|
| CN | 103795629 A | 5/2014 |
| CN | 103888359 A | 6/2014 |
| CN | 104348744 A | 2/2015 |
| EP | 2717526 A1 | 4/2014 |
| WO | 2010096552 A1 | 8/2010 |

OTHER PUBLICATIONS

Farrel, A., et al., "A Path Computation Element (PCE)-Based Architecture," Network Working Group, RFC 4655, Aug. 2006, 40 pages.

Vasseur, JP., Ed., et al., "Path Computation Element (PCE) Communication Protocol (PCEP)," Network Working Group, RFC 5440, Mar. 2009, 87 pages.

Zhao, Q., Ed., et al., "Extensions to the Path Computation Element Communication Protocol (PCEP) for Point-to-Multipoint Traffic Engineering Label Switched Paths," Internet Engineering Task Force (IETF), RFC 6006, Sep. 2010, 33 pages.

Zhao, Q., et al., "LDP Extensions for Multi-Topology," Internet Engineering Task Force (IETF), RFC 7307, Jul. 2014, 20 pages.

Foreign Communication From a Counterpart Application, PCT Application No. PCT/CN2017/079140, English Translation of International Search Report dated Jun. 23, 2017, 4 pages.

Foreign Communication From a Counterpart Application, European Application No. 17773328.4, Extended European Search Report dated May 24, 2019, 20 pages.

Foreign Communication From a Counterpart Application, European Application No. 17773328.4, Partial Supplementary European Search Report dated Jan. 29, 2019, 18 pages.

Machine Translation and Abstract of Chinese Publication No. CN102308519, Jan. 4, 2012, 25 pages.

Machine Translation and Abstract of Chinese Publication No. CN103795629, May 14, 2014, 15 pages.

Foreign Communication From a Counterpart Application, Chinese Application No. 201780018623.3, Chinese Office Action dated Dec. 3, 2019, 10 pages.

Foreign Communication From a Counterpart Application, Chinese Application No. 201780018623.3, Chinese Search Report dated Nov. 26, 2019, 2 pages.

\* cited by examiner

PCEP EXTENSION FOR PCECC SUPPORT OF DISTRIBUTED COMPUTING, MULTIPLE SERVICES, AND INTER-DOMAIN ROUTING

CROSS-REFERENCE TO RELATED APPLICATIONS

The present application claims priority to U.S. Provisional Patent Application No. 62/317,166 filed Apr. 1, 2016 by Qianglin Quintin Zhao and entitled "PCECC Inter-Domain Model For Inter-Areas/Domain With Large Scale Routes and Multiple Services," U.S. Provisional Patent Application No. 62/317,163 filed Apr. 1, 2016 by Qianglin Quintin Zhao and entitled "PCECC Distributed Model for Inter-Areas/Domain With Large Scale Routes and Multiple Services," and U.S. Provisional Patent Application No. 62/317,159 filed Apr. 1, 2016 by Qianglin Quintin Zhao and entitled "PCECC Multiple Topology Model For Inter-Areas/Domain With Large Scale Routes and Multiple Services," each of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Path Computation Element (PCE) is a network component, application, or node capable of computing sophisticated paths through a network by applying computational constraints in real time. Traditionally, network routes or paths are calculated and managed off-line as part of a network's traffic engineering. In such a scenario, when a new customer comes online, the customer's traffic requirements are evaluated and superimposed on the current network's topology. The PCE architecture is defined by the Internet Engineering Task Force (IETF) Request for Comments (RFC) 4655 document titled, "A Path Computation Element (PCE)-Based Architecture," published in August 2006, which is incorporated herein by reference.

The PCE has a complete picture of the topology of the network at the precise moment derived from other Operational Support Software (OSS) programs. As such, the PCE is able to calculate in real time the optimal path through the network. The path is then used to automatically update router configurations and the traffic engineering database. The PCE receives and responds to path computation requests received from a Path Computation Client (PCC) using a Path Computation Element Communication Protocol (PCEP). The PCEP is defined by the IETF RFC 5440 document titled, "Path Computation Element (PCE) Communication Protocol (PCEP)," published in March 2009, which is incorporated herein.

SUMMARY

According to one aspect of the present disclosure, there is provided a path computation element (PCE) central controller (PCECC) comprising a memory comprising executable instructions and a processor coupled to the memory and configured to execute the instructions. Executing the instructions causes the processor to receive a request to compute a path through a network, the request comprising a plurality of computational tasks, divide the computational tasks into a plurality of groups of computational tasks, transmit at least some of the plurality of groups of computational tasks to a plurality of path computation clients (PCCs) for computation by the PCCs, and receive, from the PCCs, computation results corresponding to the plurality of groups of computational tasks.

Optionally, in any of the preceding aspects, the PCECC transmits the at least some of the plurality of groups of computational tasks to first PCCs configured in a dual operation mode as a PCC and as a PCE.

Optionally, in any of the preceding aspects, the processor further performs first computational tasks corresponding to one of the plurality of groups of computational tasks.

Optionally, in any of the preceding aspects, the processor further computes an optimized path through the network according to the results received from the PCCs and transmits forwarding information corresponding to the optimized path to at least some of the PCCs.

Optionally, in any of the preceding aspects, the processor further receives forwarding entry information from at least some of the PCCs and updates a database of routing information with the received forwarding entry information.

Optionally, in any of the preceding aspects, the PCECC receives the request to compute the path through the network from one of the plurality of PCCs.

Optionally, in any of the preceding aspects, the PCECC is configured in a dual operation mode as a PCE and as a PCC.

According to one aspect of the present disclosure, there is provided a PCECC comprising a memory comprising executable instructions and a processor coupled to the memory and configured to execute the instructions. Executing the instructions causes the processor to receive, from a plurality of PCCs, network topology information of each of the plurality of PCCs, determine, according to the network topology information, a first subset of the plurality of PCCs, each having a first network characteristic, assign the first subset of the plurality of PCCs to a first network topology, and transmit network connection information to each PCC assigned to the first network topology and belonging to the first subset of the plurality of PCCs.

Optionally, in any of the preceding aspects, the network connection information comprises a multiprotocol label switching (MPLS) label space and an outgoing interface of a respective PCC receiving the network connection information.

Optionally, in any of the preceding aspects, the processor determines the first subset of the plurality of PCCs and assigns the first subset of the plurality of PCCs to the first network topology in response to receiving a request to determine a path through a network in which the plurality of PCCs are located.

Optionally, in any of the preceding aspects, the processor further determines, according to the network topology information, a second subset of the plurality of PCCs, each having a second network characteristic, assigns the second subset of the plurality of PCCs to a second network topology, and transmits network connection information to each PCC assigned to the second network topology and belonging to the second subset of the plurality of PCCs.

Optionally, in any of the preceding aspects, the first network topology services a first network service, and wherein the second network topology services a second network service separately from the first network service.

Optionally, in any of the preceding aspects, a first PCC belonging to the first subset of the plurality of PCCs belongs to the second subset of the plurality of PCCs.

Optionally, in any of the preceding aspects, a second PCC belonging to the first subset of the plurality of PCCs does not belong to the second subset of the plurality of PCCs.

Optionally, in any of the preceding aspects, the first network characteristic is selected from a group consisting of bandwidth, quality of service (QoS), service type, delay, and reliability.

According to one aspect of the present disclosure, there is provided a PCECC comprising a memory comprising executable instructions and a processor coupled to the memory and configured to execute the instructions. Executing the instructions causes the processor to receive a request to compute a path crossing a plurality of domains in a network, compute a core tree coupling the plurality of domains, assign a first MPLS label space and an outgoing interface using PCE communication protocol (PCEP) to a first edge node of a first domain associated with the PCECC, and assign a second MPLS label space and an incoming interface using PCEP to a second edge node of a second domain that is coupled to the first edge node of the first domain.

Optionally, in any of the preceding aspects, the processor further computes a path from the first edge node of the first domain to a destination located in the first domain, wherein the destination is indicated by the request to compute the path crossing the plurality of domains in the network, and wherein the path includes a plurality of internal nodes in the first domain, and assigns a third MPLS label space and an outgoing interface using PCEP to each of the plurality of internal nodes in the first domain.

Optionally, in any of the preceding aspects, the first edge node, the second edge node, and the plurality of internal nodes are PCCs.

Optionally, in any of the preceding aspects, the path crossing the plurality of domains in the network is a multicast path.

Optionally, in any of the preceding aspects, the path crossing the plurality of domains in the network is a unicast path.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
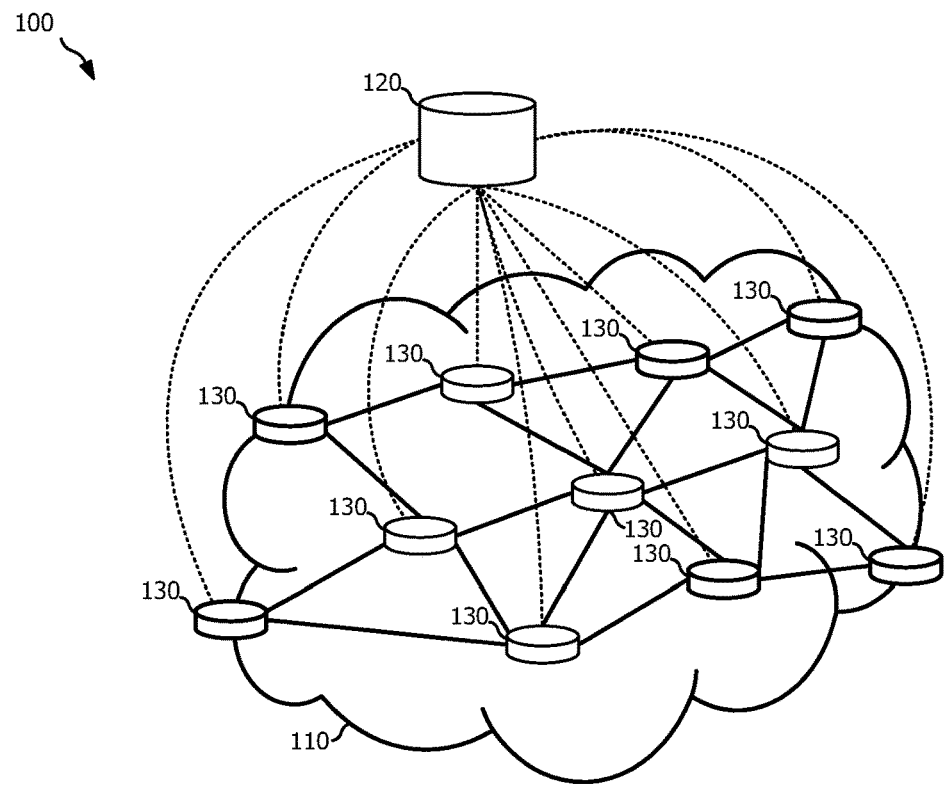
FIG. 1 is a schematic diagram of an embodiment of a SDN.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for communications among network elements communicating according to path computation element (PCE) communication protocol (PCEP) in a software defined network (SDN). The disclosed embodiments are implemented, for example, by a PCE central controller (PCECC). For example, the PCECC may receive a request to compute a path or paths through a network and distribute computational tasks associated with computing the path or paths to a plurality of path computation clients (PCCs) which are configured to include functionality as a PCC and as a PCE. For example, in some embodiments the PCECC receives a request to compute a path through a network, the request comprising a plurality of computational tasks, divides the computational tasks into a plurality of groups of computational tasks, transmits at least some of the plurality of groups of computational tasks to a plurality of PCCs for computation by the PCCs, and receives, from the PCCs, computation results corresponding to the plurality of groups of computational tasks.

Additionally, or alternatively, the PCECC receives network topology information for a network and divides nodes in the network into a plurality of groups having a common network characteristic. For example, the PCECC may receive, from a plurality of PCCs, network topology information of each of the plurality of PCCs, determine, according to the network topology information, a first subset of the plurality of PCCs, the first subset including first PCCs having a first network characteristic, assign the first PCCs belonging to the first subset of the plurality of PCCs to a first network topology, and transmit network connection information to each PCC assigned to the first network topology and belonging to the first subset of the plurality of PCCs.

Additionally, or alternatively, the PCECC receives a request to compute a path crossing multiple domains and assigns MPLS labels and interfaces to nodes along the path using PCEP. For example, the PCECC receives a request to compute a path crossing a plurality of domains in a network, computes a core tree coupling the plurality of domains, assigns a first MPLS label space and an outgoing interface using PCEP to a first edge node of a first domain associated with the PCECC, and assigns a second MPLS label space and an incoming interface using PCEP to a second edge node of a second domain that is coupled to the first edge node of the first domain.

Network elements such as PCECCs may become overloaded when requested to compute one or more paths through networks having many nodes and/or possible path, thereby resulting in degraded performance for a user, for example, as a result of delay in computing the path due to the overloading. Additionally, in networks which include various slices or groupings of nodes in a network, the nodes may be assigned to the groups manually by an administrator, thereby resulting in a lack of efficiency and inhibiting rapid and dynamic slicing of the network in response to changing network demands and requests. Furthermore, in some networks, nodes include additional complexity in communicating according to multiple protocols, for example, PCEP and MPLS, thereby increasing cost. The inventive concepts disclosed herein solve the problem of the prior art by enabling a PCECC to distribute path computation tasks to one or more PCCs dual configured as PCCs and PCEs, enabling a PCECC to determine network slices from received network topology information and assign nodes in the network to the network slices, and assign labels and interfaces to nodes across multiple domains, all according to PCEP.

Referring now to FIG. 1, a schematic diagram of an embodiment of a SDN 100 is shown. The SDN 100 comprises a PCECC 120 configured to communicate with any one or more PCCs 130 located in a network 110 and the plurality of PCCs 130 are communicatively coupled, either directly or indirectly, to the PCECC 120. The PCECC 120 and the PCCs 130 may communicate with each other via any one or more of optical, electrical, or wireless mediums. The PCECC 120 communicates with at least some of the PCCs 130 according to the PCEP.

In an embodiment, the network 110 may be a packet switched network, where data traffic is transported using packets or frames along network paths or routes. The packets are routed or switched along a label switched path (LSP) (e.g., a Traffic Engineering (TE) LSP) established by a signaling protocol, such as Multiprotocol Label Switching (MPLS) or Generalized MPLS (GMPLS), based on a path computed by the PCECC 120 and/or the PCCs 130. The PCCs 130 are coupled to one another using any one or more of optical, electrical, or wireless links. The network 110 may also comprise a plurality of domains (not shown), such as Autonomous System (AS) domains or interior gateway protocol (IGP) areas, which may each comprise a set of network elements corresponding to the same address management and/or path computational responsibility. The domains may be organized via physical means (e.g., location, connections, etc.) or logical means (e.g., network topology, protocols, communication layers, etc.). The domains may be coupled to each other within the network 110 and may each comprise some of the PCCs 130.

The PCCs 130 are any devices or components that support communication according to PCEP and transportation of the packets through the network 110. For example, the PCCs 130 may include bridges, switches, routers, or various combinations of such devices. The PCCs 130 comprise a plurality of ingress ports for receiving packets from other PCCs 130, logic circuitry that determines which PCCs 130 to send the frames to, and a plurality of egress ports for transmitting frames to the other PCCs 130. In some embodiments, at least some of the PCCs 130 may be label switched routers (LSRs), configured to modify or update the labels (e.g., MPLS labels) of the packets transported in the network 110. Further, some of the PCCs 130 may be label edge routers (LERs). For example, the PCCs 130 at the edges of the network 110 may be configured to insert or remove the labels of the packets transported between the network 110 and external networks. The first PCC 130 and the last PCC 130 along a path are sometimes referred to as the source node and the destination node, respectively. Although eleven PCCs 130 are shown in the network 110, the network 110 may comprise any quantity of PCCs 130. Additionally, in some embodiments at least some of the PCCs 130 are located in different domains in the network 110 and configured to communicate across multiple domains. For example, the PCCs 130 that correspond to different domains may exchange packets along a path that may be established across multiple domains.

The PCECC 120 is any device configured to perform all or part of the path computation for the network 110, e.g., based on a path computation request. In some embodiments, the PCECC 120 receives information that may be used for computing a path through the network 110 from a device located outside the SDN 100, from one or more of the PCCs 130, or both. The PCECC 120 may then process the information to obtain the path through the network 110. For example, the PCECC 120 computes the path through the network 110 and determines the PCCs 130 including the LSRs along the path according to the received information. The PCECC 120 may then send all, or part, of the computed path information to at least one PCC 130. Further, in some embodiments the PCECC 120 is coupled to, or comprises, a traffic-engineering database (TED), a point to multipoint (P2MP) Path database (PDB), a point to point (P2P) path database, an optical performance monitor (OPM), a physical layer constraint (PLC) information database, or combinations thereof, which may be used by the PCECC 120 to compute the path. The PCECC 120 is generally located in a component outside of the network 110, such as an external server, but in some embodiments may be located in a component within the network 110, such as a PCC 130.

In an embodiment, a path computation request is sent by a PCC 130 to the PCECC 120. The path computation request may originate, for example, with an application or service executing on the PCC 130 which requests computation of a path through the network 110. For example, the PCC 130 may request from the PCECC 120 a P2MP path or P2P path in a single domain or across multiple domains in the network 110. Additionally, the PCC 130 may send the PCECC 120 at least some information for use in determining the path in response to the path computation request.

In some embodiments, the path computation request sent by the PCC 130 to the PCECC 120 may request computation by the PCECC 120 of a plurality of paths through the network 110. In other embodiments, the PCECC 120 may receive a plurality of path computation requests substantially contemporaneously, each of which may request computation of one or more paths through the network 110. In either of these embodiments, when the network 110 comprises many PCCs 130 (e.g., thousands, hundreds of thousands, millions, or more), the PCECC 120 may become overloaded. The overload may result in degraded performance of the PCECC 120 such as, for example, an inability to compute all of the paths requested, delays in computing the paths requested, etc. To aid in alleviating the possible overload and resulting degraded performance, embodiments of the present disclosure compute the requested path segments in a distributed manner, as discussed below.

To enable computation of the requested path segments in the distributed manner, the PCECC 120 and at least some of the PCCs 130 are configured in a dual operation mode or as having a dual role in the network 110. For example, the PCECC 120 is configured both as a PCE and as a PCC, and at least some of the PCCs 130 are configured both as PCCs and as PCEs. Any number of PCCs 130 may be configured according to the dual operation mode based on, for example, a location and/or proximity to the PCECC 120 of a respective PCC 130 in the network 110, a desired number or percentage of dual operation mode PCCs 130, a computational capacity or hardware specification of a respective PCC 130, and/or any other suitable criteria for determining a number of PCCs 130 to configure in the dual operation mode.

Figure 2:
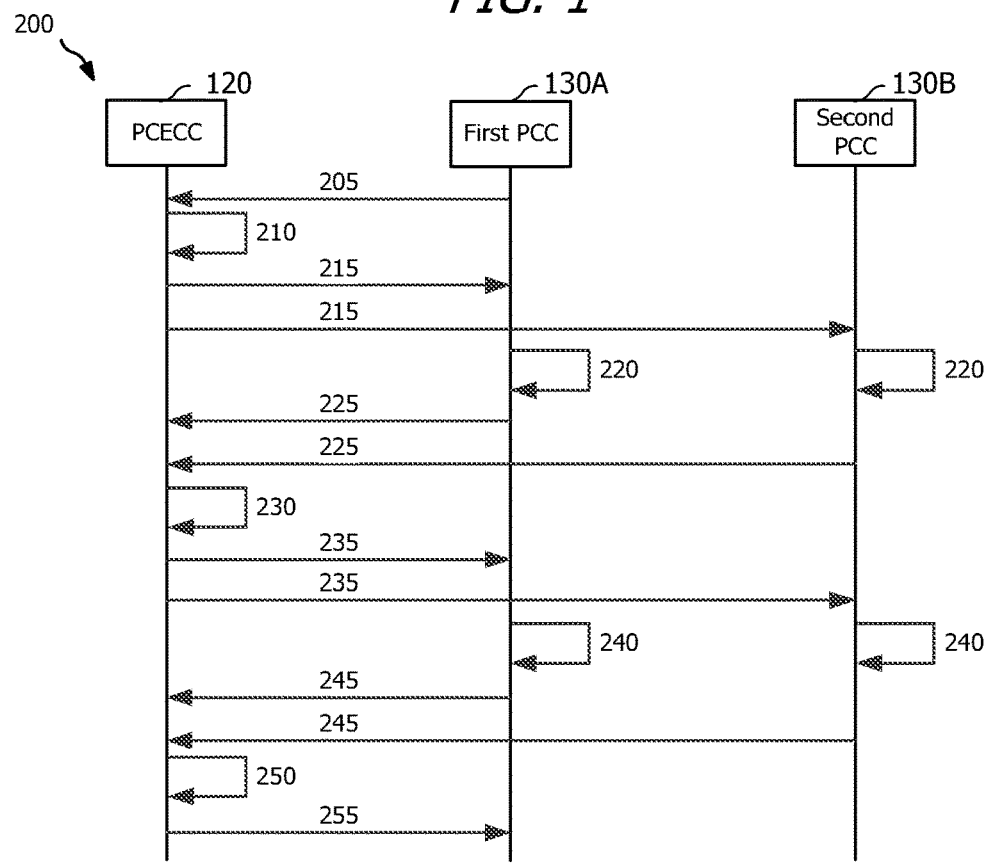
FIG. 2 is a protocol diagram of an embodiment of communication in an SDN.

Referring now to FIG. 2, a protocol diagram 200 of an embodiment of communication in the SDN 100 is shown. The protocol diagram 200 illustrates communication among the PCECC 120 configured as both a PCE and a PCC, a first PCC 130A configured as both a PCC and a PCE, and a second PCC 130B configured as both a PCC and a PCE. At least one of the first PCC 130A or the second PCC 130B may be an ingress node in the network 110 (e.g., a node, such as a source node, at which data routed according to a path determined in response to a path computation request enters the network 110). At step 205, the PCECC 120 receives a request for calculating a path through the network 110. The request is, in some embodiments, a path computation request. While illustrated as being received by the PCECC 120 from the first PCC 130A, it should be understood that the request may be received by the PCECC 120 from any PCC 130 in the network 110, whether configured as a PCC alone or as a PCC and a PCE in the dual operation mode, or from a device outside of the network 110 and/or the SDN 100. At step 210, the PCECC 120 divides the received request into a plurality of individual computational tasks. In some embodiments the request is divided into portions having an approximately equal number of tasks, while in other embodiments the portions may have different numbers of tasks. At step 215, the PCECC 120 transmits a first portion of the tasks to the first PCC 130A and a second portion of the tasks to the second PCC 130B. In some embodiments, the first portion of the tasks and the second portion of the tasks comprise all computational tasks that are to be carried out in response to the received request. In other embodiments, the PCECC 120 may itself perform computations according to a third portion of the tasks that are not transmitted to the first PCC 130A or the second PCC 130B. It should be noted that while illustrated as the PCECC 120 transmitting the tasks to both the first PCC 130A and the second PCC 130B, the PCECC 120 may transmit any portion of the tasks to any one or more of the PCCs 130 in the network 110 which are configured in the dual operation mode such that not all PCCs 130 in the network 110 receive the tasks, not all PCCs 130 which are configured in the dual operation mode receive the tasks, and/or a number of tasks received by one PCC 130 in the network 110 varies from a number of tasks received by another PCC 130 in the network 110.

At step 220, the first PCC 130A and the second PCC 130B perform computations and/or other activities associated with, or directed by, the tasks received from the PCECC 120. For example, the first PCC 130A and the second PCC 130B each calculate at least a portion of a path through at least a portion of the network 110. At step 225, the first PCC 130A and the second PCC 130B transmit the results obtained responsive to the tasks received at step 215 to the PCECC 120. At step 230, the PCECC 120 calculates a globally optimized path through the network 110 responsive to the request received at step 205 and based at least in part on the results received from the first PCC 130A and the second PCC 130B. For example, when the first PCC 130A and the second PCC 130B each calculated at least a portion of multiple paths through at least a portion of the network 110, the PCECC 120 may determine a most optimized path from among the multiple paths. The globally optimized path may be optimized such that it traverses a minimum number of PCCs 130 in the network 110, has a minimum quality of service (QoS) characteristic, has a minimum bandwidth characteristic, has a minimum delay time, has a minimum reliability characteristic, and/or any other suitable optimization criteria or combination of criteria.

At step 235, the PCECC 120 transmits forwarding information for the globally optimized path to the first PCC 130A and the second PCC 130B. It should be noted that while illustrated as the PCECC 120 transmitting the forwarding information to the first PCC 130A and the second PCC 130B, generally, the PCECC 120 transmits the forwarding information to each ingress node in the network 110 that is configured in the dual operation mode. At step 240, the first PCC 130A and the second PCC 130B each build an optimized forwarding path according to the forwarding information received from the PCECC 120. The optimized forwarding path is, for example, stored locally by each of the first PCC 130A and the second PCC 130B and appended to data (e.g., as a header or portion of a header) when the first PCC 130A or the second PCC 130B receives data for forwarding through the network 110. The first PCC 130A and the second PCC 130B, in some embodiment, each comprise a forwarding engine configured to build the optimized forwarding path.

At step 245, the first PCC 130A and the second PCC 130B each transmit forwarding entry information corresponding to the optimized forwarding path to the PCECC 120. The first PCC 130A and the second PCC 130B, in some embodiments, each transmit the forwarding entry information via a forwarding engine. At step 250, the PCECC 120 updates a data store (e.g., a TED, a routing table, a forwarding table, or any other suitable data structure for storing forwarding information for the network 110) with the forwarding entry information received from the first PCC 130A and the second PCC 130B. At step 255, the PCECC 120 transmits a reply message to the first PCC 130A responsive to the request for calculating a path received at step 205. The reply message is, in some embodiments, a path computation reply message. While illustrated as being sent by the PCECC 120 to the first PCC 130A, it should be understood that the request may be sent by the PCECC 120 to the device from which the PCECC 120 receives the request at step 205.

As illustrated in FIG. 2, each of the PCECC 120, the first PCC 130A, and the second PCC 130B is configured in the dual operation mode. For example, from a perspective of the device from which the PCECC 120 receives the request at step 205 (which may be, for example, a PCC 130 in the network 110), the PCECC 120 is configured as a PCC. From the perspective of the first PCC 130A and the second PCC 130B, the PCECC 120 is configured as a PCE. From the perspective of the PCECC 120, the first PCC 130A and the second PCC 130B are each configured as a PCC. From the perspective of the first PCC 130A and the second PCC 130B, each is respectively configured as a PCE.

Figure 3:
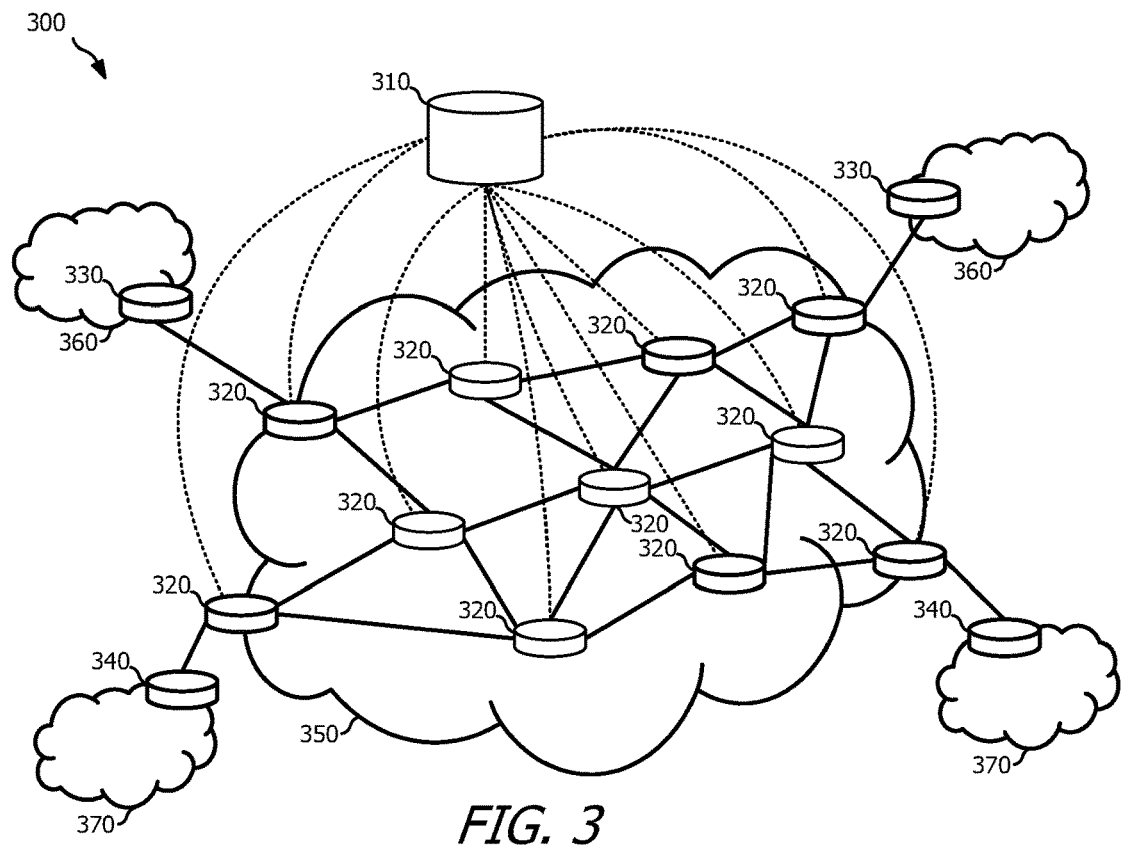
FIG. 3 is a schematic diagram of another embodiment of a SDN.

Referring now to FIG. 3, a schematic diagram of another embodiment of a SDN 300 is shown. The SDN 300 comprises a PCECC 310, a plurality of PCCs 320, Internet Protocol version 4 (IPv4) nodes 330, Internet Protocol version 6 (IPv6) nodes 340, network 350, IPv4 networks 360, and IPv6 networks 370. In some embodiments, the PCECC 310, PCCs 320, and network 350 each include at least some hardware, software, and/or functionality which is substantially similar to the PCECC 120, the PCCs 130 and the network 110, respectively. In other embodiments, at least some of the PCECC 310, PCCs 320, and network 350 include at least some hardware, software, and/or functionality such as described below. The IPv4 nodes 330 are network elements that are located at an edge of a provider network and/or a customer network and which communicate according to IPv4. The IPv6 nodes 340 are network elements that are located at an edge of a provider network and/or a customer network and which communicate according to IPv6. The IPv4 networks 360 each comprise an IPv4 node 330 and may further comprise a plurality of other network elements (not shown) configured to perform communication in the respective IPv4 network 360. Each of the IPv4 networks 360 may be a provider network or a customer network. The IPv6 networks 370 each comprise an IPv6 node 340 and may further comprise a plurality of other network elements (not shown) configured to perform communication in the respective IPv6 network 370. Each of the IPv6 networks 370 may be a provider network or a customer network.

In some embodiments, data transiting the network 350 from a source (e.g., a provider network) to a destination (e.g., a customer network) may be permitted to only traverse certain PCCs 320 within the network 250. For example, data originating from an IPv4 network 360 may only be permitted to traverse PCCs 320 belonging to a first set of PCCs 320 of the network 350 when in transit to another IPv4 network 360. Similarly, data originating from an IPv6 network 370 may only be permitted to traverse PCCs 320 belonging to a second set of PCCs 320 of the network 350 when in transit to another IPv6 network 370. As another example, data transiting the network 350 may be permitted to only traverse certain PCCs 320 which offer a prescribed minimum bandwidth, reliability, QoS, delay, level of security, or other network criteria or metric. As yet another example, second data transiting the network 350 may be permitted to only traverse certain PCCs 320 (e.g., internal PCCs 320 between two PCCs 320 located on edges of the network 350) which first data transiting the network 350 has not traversed (e.g., or with minimal overlap in PCCS 320 traversed such that an interruption in service along a path taken by the first data does not affect the second data, thereby enabling the second data to serve as a backup to the first data).

To enable allocation of PCCs 320 in the network 350 to one or more of a plurality of sets, the PCECC 310 is further configured to slice or divide a default topology of the network 350 (e.g., comprising all PCCs 320 in the network 350) into multiple topologies, where each of the multiple topologies comprises less than all PCCs 320 in the network 350. In some embodiments, a single PCC 320 may belong to multiple topologies of the network 350 other than the default topology, while in other embodiments each PCC 320 is permitted to only belong to a single topology of the network 350 other than the default topology or is permitted to only belong to the default topology. In the context of MPLS networks, multiple topology technology may be further described by the IETF RFC 7307 document titled, "LDP Extensions for Multi-Topology," published in July 2014, the entirety of which is hereby incorporated by reference.

In some embodiments, the PCECC 310 receives information from one or more of the PCCs 320 describing characteristics of the respective PCC 320. The information may include network characteristics associated with the PCCs 320, for example, bandwidth, reliability, QoS, delay, level of security, physical location, connections and accesses, and/or other network criteria of the PCC 320. Based on the information received from the PCCs 320, the PCECC 310 slices the network 350 into the multiple topologies based on desired network characteristics. For example, the PCECC 310 may slice the network 350 into a plurality of topologies among which include a topology with a certain desired minimum bandwidth, a topology having a minimum level of reliability (e.g., such as a ring topology), and a topology having an amount of delay less than a desired level. As another example, the PCECC 310 may slice the network 350 into a plurality of topologies based on the same network characteristic such as a topology having a first minimum bandwidth, a topology having a second minimum bandwidth, and a topology having a third minimum bandwidth. It should be noted that while three slices or network topologies are described herein for exemplary purposes, the network 350 may be sliced into any number of network topologies based on any one or more desired network characteristics.

After slicing the network 350 into the multiple topologies, the PCECC 310 transmits details of the multiple topologies to the PCCs 320. In some embodiments, the PCECC 310 transmits a message (e.g., a network connection information message) to each PCC 320 assigned to a particular topology of the multiple topologies, the message including an interface (e.g., an outgoing interface of the respective PCC 320 receiving the message) and MPLS label space for use by the PCC 320 in transmitting data associated with the particular topology to which the PCC 320 is assigned. The interface may be a physical component (e.g., a circuit of the PCC 320), a software implementation, or a combination of both that enable the PCC 320 to communicate data (e.g., receive and transmit) with other PCCs 320 in the network 350. The MPLS label space includes one or more MPLS labels (e.g., as indicated by a range of allowable labels) which may be appended to data received for the first time in the network 350 by the PCC 320 to indicate a manner of routing the data through the network 350 (e.g., a full or partial list of links or nodes for the data to traverse) to subsequent PCCs 320 in the network 350. In some embodiments, categorizing or slicing the PCCs 320 of the network 350 into the multiple topologies may be referred to as coloring links among the PCCs 320 and/or the PCCs 320 in the network 350. For example, the links among the PCCs 320 in the network 350 may be sliced into a plurality of groups, each associated with a color such that a PCC 320, after having been assigned to one of the groups or colored topologies, may identify the topology according to the associated color. For example, the default topology of the network 350 may be sliced, in some embodiments, into a red topology, a green topology, and a blue topology, where each topology corresponds to certain network characteristics that are provided by the PCCs 320 belonging to the respective topology.

After receiving the details of the multiple topologies from the PCECC 310, the PCCs 320 store the details (e.g., in a forwarding table, routing table, etc.) for use in routing received data packets. When a PCC 320 receives a data packet at an incoming interface, the PCC 320 analyzes the data packet to determine whether the data packet has one or more topology selection criterion (e.g., an explicit minimum or maximum value for a network characteristic, a topology color, etc.). When the data packet includes a topology selection criterion, the PCC 320 determines whether the topology selection criterion corresponds to a topology for which the PCC 320 has received an interface and label space from the PCECC 310. When the topology selection criterion does not correspond to a topology for which the PCC 320 has received an interface and label space from the PCECC 310, or the data packet does not contain a topology selection criterion, the PCC 320 forwards the data packet through via an interface of the PCC 320 associated with the default topology of the network 350. When the topology selection criterion does correspond to a topology for which the PCC 320 has received an interface and label space from the PCECC 310, the PCC 320 forwards the data packet via the interface of the PCC 320 indicated by the PCECC 310 for use in communicating data through the respective topology of the network 350 requested by the data packet. Enabling the PCECC 310 to automatically and dynamically assign the PCCs 320 to the multiple topologies of the network 350, in some embodiments, allows the PCECC 310 to adjust rapidly to changing network characteristics, network demands, and requests for path computations and data routing without necessitating intervention by a human user to color each PCC 320 for use in one or more of the multiple topologies, thereby more efficiently performing communications in the SDN 300.

Figure 4:
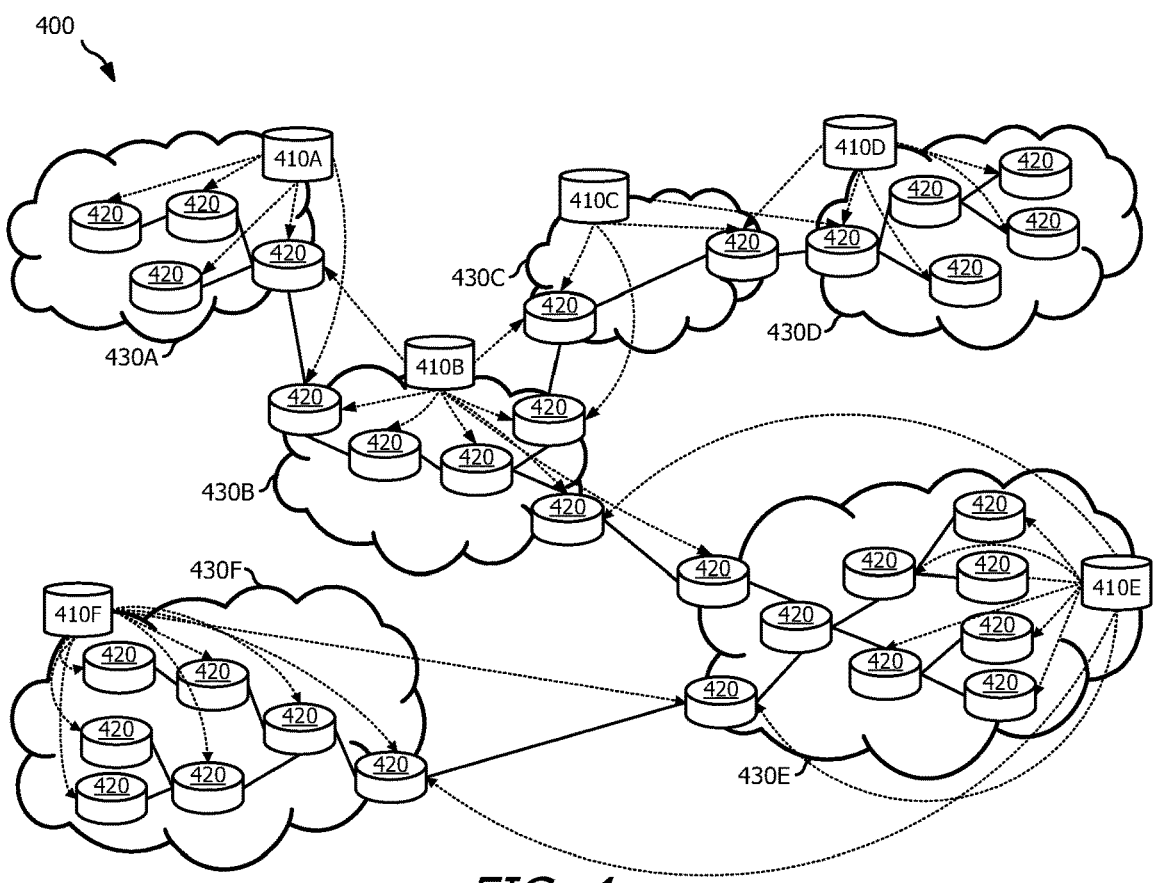
FIG. 4 is a schematic diagram of another embodiment of a SDN.

Referring now to FIG. 4, a schematic diagram of another embodiment of a SDN 400 is shown. The SDN 400 comprises a plurality of PCECCs 410A, 410B, 410C, 410D, 410E, and 410F (410A-410F), a plurality of PCCs 420, each of which may be substantially similar to the, and domains 430A, 430B, 430C, 430D, 430E, and 430F (430A-430F). In some embodiments, the PCECCs 410A-410F and PCCs 420 each include at least some hardware, software, and/or functionality which is substantially similar to the PCECC 120 and/or the PCECC 310 or the PCCs 130 and/or the PCCs 420, respectively. In other embodiments, at least some of the PCECCs 410A-410F or PCCs 420 include at least some hardware, software, and/or functionality such as described below. In some embodiments, each of the domains 430A-430F may belong to a same network, which may be substantially similar to the network 110 and/or the network 350. In other embodiments, each of the domains 430A-430F may itself be a separate network, which may be substantially similar to the network 110 and/or the network 350. The domains 430A-430F may be organized via physical means (e.g., location, connections, etc.) or logical means (e.g., network topology, protocols, communication layers, etc.).

When the PCECC 410A receives a request for computing a path that crosses multiple domains in the SDN 400, the PCECC 410A initiates computation of a path corresponding to the request (e.g., between a source and a destination identified by the request). The request may be received from a PCC 420 in the domain 430A or from any other suitable network device inside or outside the SDN 400, as discussed above with respect to FIG. 1. It should be noted that while discussed with reference to the PCECC 410A, the request may be received by any PCECC 410A-410F from a PCC 420 in a respectively corresponding domain 430A-430F or from any other suitable network device inside or outside the SDN 400, as discussed above with respect to FIG. 1, and a source of the request for computing a path and a particular PCECC 410A-410F which receives the request is not limited herein. After receiving the request, the PCECC 410A initiates computation of a shortest path (e.g., comprising a core tree and one or more sub-trees) from a source to a destination, both identified in the request. In some embodiments, the request may indicate a single destination such that the PCECC 410A determines a P2P (e.g., unicast) path across the domains 430A-430F, while in other embodiments the request may indicate multiple destinations such that that PCECC 410A determines a P2MP (e.g., multicast) path across the domains 430A-430F.

The PCECC 410A begins computing the path through the SDN 400 by computing a core tree in the SDN 400 from the source to the destination. The core tree includes at least one PCC 420 in each domain 430A-430F between the source and the destination with each PCC 420 included in the core tree being located on an edge (e.g., as an edge node or a border node) of its respective domain 430A-430F. After computing the core tree, each PCECC 410A-410F assigns labels and interfaces to the PCCs 420 located on an edge of the respective domain 430A-430F of the PCECC 410A-410F and which are included in the core tree. Each PCECC 410A-410F also assigns labels and interfaces to PCCs 420 located on an edge of an adjacent domain 430A-430F of the respective PCECC 410A-410F and which are included in the core tree. The labels and interfaces are assigned, for example, using PCEP to communicate between the PCECC 410A-410F and the PCCs 420. The labels and interfaces are used by the PCCs 420 to route data packets through the SDN 400, for example, from one domain 430A-430F to another domain 430A-430F, such as according to MPLS. For example, when a PCC 420 receives a data packet, the PCC 420 forwards the data packet via the interface and using the label assigned by the PCECC 410A-410F.

After the PCECC 410A-410F assign the labels and interfaces to the PCCs 420 located on edges of the domains 430A-430F and which are included in the core tree, the PCECC 410A computes sub-trees in each domain 430A-430F, for example, from the PCC 420 located on an edge of a domain 430A-430F to the destination located within the respective domain 430A-430F. The sub-trees extend, in some embodiments, from the PCCs 420 located on edges of the domains 430A-430F and which are included in the core tree extending outward into the respective domains 430A-430F until all destinations indicated in the request message received by the PCECC 410A are included in a sub-tree. After computing the sub-trees, each PCECC 410A-410F assigns labels and interfaces to the PCCs 420 in the respective domains 430A-430F and which are included in the sub-tree, other than the PCCs 420 located on edges of the domains 430A-430F. The labels and interfaces are used by the PCCs 420 to route data packets through the SDN 400, for example, from a PCC 420 located on an edge of a domain 430A-430F to a destination located in the respective domain 430A-430F, such as according to MPLS. The labels and interfaces are assigned, for example, using PCEP to communicate between the PCECC 410A-410F and the PCCs 420. For example, when a PCC 420 receives a data packet, the PCC 420 forwards the data packet via the interface and using the label assigned by the PCECC 410A-410F. Enabling the PCECCs 410A-410F to assign labels and/or interfaces to the PCCs 420 according to PCEP provides for similar communication among the PCECCs 410A-410F and the PCCs 420 and reduces a number of varying communication protocols utilized in the SDN 400. Such use of PCEP by the PCECCs 410A-410F in assigning labels and/or interface allows for more efficient communications in the SDN 400 using fewer resources and a comparatively faster speed when compared to assigning labels and/or interfaces according to, for example, MPLS communications protocols.

Computation of the core tree and the sub-trees may be performed according to any suitable process, for example, a Backward Recursive Path Calculation (BRPC) procedure, a Constrained Shortest Path First (CSPF) procedure, or any other path computation procedure suitable for computing a path in the SDN 400, such as disclosed herein with respect to FIGS. 1 and 2. Additionally, it should be noted that while discussed as occurring substantially sequentially (one after another), the core tree and the sub-trees may be computed substantially simultaneously or with any other amount of overlapping time by the PCECC 410A. Computation of the core tree and the sub-trees in the SDN 400 may be more fully described in International Patent Application No. PCT/US2010/024577, entitled "System and Method for Point to Multipoint Inter-domain Multiprotocol Label Switching Traffic Engineering Path Calculation," filed Feb. 18, 2010 by Futurewei Technologies, Inc. and entitled "System and Method for Point to Multipoint Inter-Domain Multiprotocol Label Switching Traffic Engineering Path Calculation," which is incorporated herein by reference as if reproduced in its entirety.

Figure 5:
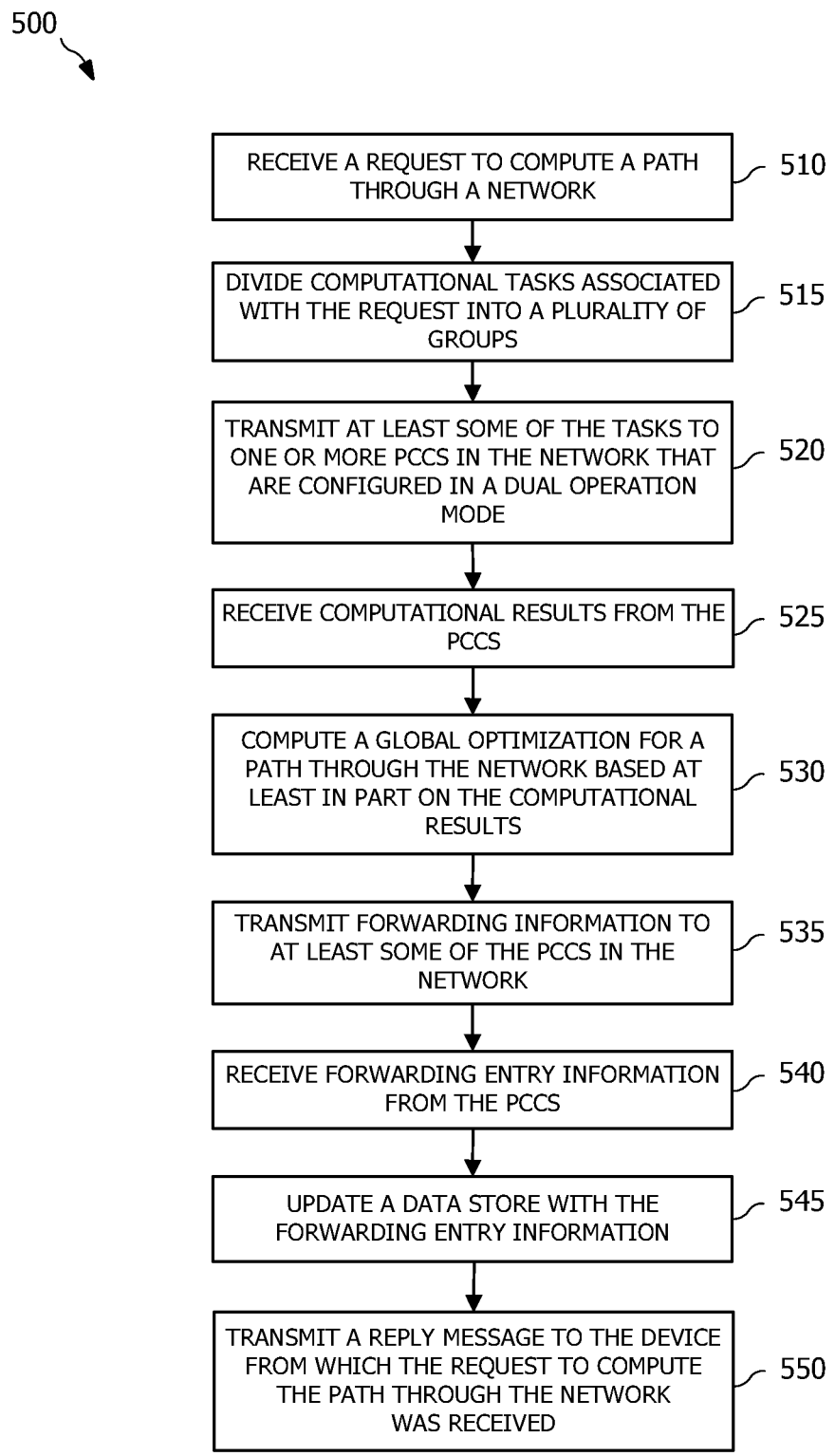
FIG. 5 is a flowchart of an embodiment of a method for communication by a PCECC.

Referring now to FIG. 5, a flowchart of an embodiment of a method 500 for communication by a PCECC is shown. The method 500 is implemented by a PCECC in an SDN, for example, the PCECC 120 in the SDN 100, both of FIG. 1, when the PCECC receives a request to compute paths through a network, for example the network 110, also of FIG. 1. In some embodiments, the PCECC of the method 500 may function substantially similarly to the PCECC 120 discussed with reference to the protocol diagram 200 of FIG. 2. At step 510, the PCECC receives a request to compute a path through the network. The request is received, for example, from a PCC (e.g., one of the PCCs 130 of FIG. 1) or from a network device located outside the network and/or the SDN. The request is, in some embodiments, a path computation request formatted according to PCEP. At step 515, the PCECC divides computational tasks associated with the request into a plurality of sub-tasks or groups of tasks. The tasks may be divided according to any suitable means which are not limited herein.

At step 520, the PCECC transmits at least some of the tasks to any one or more PCCs in the network that are configured in a dual operation mode having the functionality of both a PCC and a PCE. In various embodiments, the PCECC transmits any number of computational tasks to the PCCs such that a first PCC may receive more, or fewer, computational tasks than a second PCC. Additionally, the PCECC may not transmit computational tasks to all PCCs in the network, and which ones of the PCCs in the network receive which of the various computational tasks is not limited herein. At step 525, the PCECC receives computational results from the PCCs that received computational tasks at step 520. The results are, for example, one or more paths, or partial paths, through the network. At step 530, the PCECC computes a global optimization for a path through the network based at least in part on the computational results received at step 525. For example, after receiving the results from the PCCs, the PCECC may compute a path through the network that is optimized such that it traverses a minimum number of PCCs in the network, has a minimum QoS characteristic, has a minimum bandwidth characteristic, has a minimum delay time, has a minimum reliability characteristic, and/or any other suitable optimization criteria or combination of criteria.

At step 535, the PCECC transmits forwarding information to at least some of the PCCs in the network. For example, the PCECC may transmit the forwarding information to PCCs that are ingress nodes in the network. The forwarding information, in some embodiments, comprises information relating to the globally optimized path computed at step 530. For example, the forwarding information may comprise a listing of one or more links, hops, labels, or other identifying information that the PCCs may append to data traversing the network via the globally optimized path and/or may use in routing the data traversing the network (e.g., such as in determining a label and interface to use when forwarding the data to a next PCC along the globally optimized path). At step 540, the PCECC receives forwarding entry information from the PCCs. The forwarding entry information is, for example, a forwarding path computed by at least some of the PCCs based at least in part on the forwarding information transmitted by the PCECC at step 535. At step 545, the PCECC updates a data store (e.g., a TED, a routing table, a forwarding table, or any other suitable data structure for storing forwarding information for the network) with the forwarding entry information received at step 540. At step 550, the PCECC transmits a reply message to a device from which the PCECC received the request to compute a path through the network at step 510. The reply message is, in some embodiments, a path computation reply message.

Figure 6:
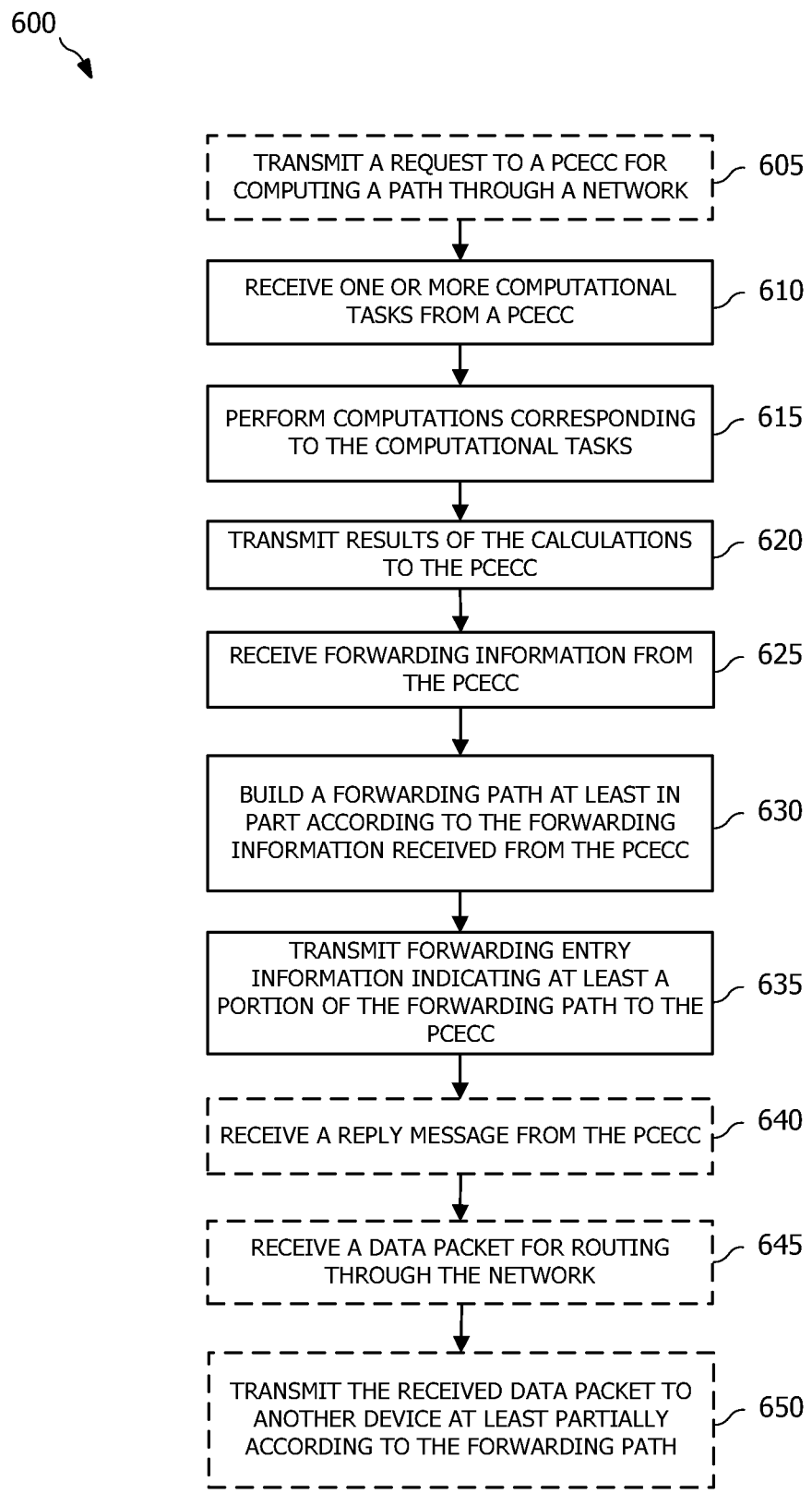
FIG. 6 is a flowchart of an embodiment of a method for communication by a PCC.

Referring now to FIG. 6, a flowchart of an embodiment of a method 600 for communication by a PCC is shown. The method 600 is implemented by a PCC in an SDN, for example any one of the PCCs 130 in the SDN 100 of FIG. 1, when the PCC receives communication from another network element, for example, a PCECC, such as the PCECC 120 of FIG. 1. In some embodiments, the PCC of the method 600 may function substantially similarly to the first PCC 130A and/or the second PCC 130B discussed with reference to the protocol diagram 200 of FIG. 2. At step 610, the PCC receives one or more computational tasks from the PCECC. The computational tasks include, for example, computing at least a portion of one or more paths between at least two nodes (e.g., two PCCs, a source and a destination, etc.) in the network. At step 615, the PCC performs computations corresponding to the computational tasks received at step 610. The computations include, for example, calculating at least a portion of one or more paths through the network. At step 620, the PCC transmits results of the calculations performed at step 615 to the PCECC. At step 625, the PCC receives forwarding information from the PCECC. The forwarding information may comprise a listing of one or more links, hops, labels, and/or other identifying information which the PCCs may append to data traversing the network via the globally optimized path and/or may use in routing the data traversing the network (e.g., such as in determining a label and interface to use when forwarding the data to a next PCC along the globally optimized path). At step 630, the PCC builds a forwarding path at least in part according to the forwarding information received from the PCECC at step 625. The forwarding path, for example, is optimized according to the forwarding information such that it includes nodes (e.g., PCCs) resulting in a minimum possible delay in traversing data through the network from a first node to a second node, such that a fewest possible number of nodes are traversed between the first and second nodes, and/or any other suitable metric for optimization based at least in part on the forwarding information. At step 635, the PCC transmits forwarding entry information to the PCECC, where the forwarding entry information indicates at least a portion of the forwarding path built by the PCC at step 630.

In some embodiments, the method 600 further includes step 605. At step 605, the PCC transmits a request to the PCECC for computing a path through the network. The request message is, in some embodiments, a path computation request message. The request may be received by the PCC at an edge of the network from a device outside of the network and may be forwarded to the PCECC for computation according to the foregoing steps of the method 600.

In some embodiments, the method 600 further includes step 640. At step 640, the PCC receives a reply message from the PCECC, where the reply message is in response to the request message transmitted to the PCECC at step 605. The reply message is, in some embodiments, a path computation reply message. The reply message may be forwarded by the PCC to the device from which the PCC received the request transmitted to the PCECC at step 605.

In some embodiments, the method 600 further includes step 645. At step 645, the PCC receives a data packet for routing through the network. The data packet is received by the PCC, for example, from a device outside of the network (e.g., when the PCC is an ingress or edge node of the network) or from another PCC within the network.

In some embodiments, the method 600 further includes step 650. At step 650, the PCC transmits the data packet received at step 645 to another device (e.g., another PCC in the network or a device outside of the network). The PCC transmits the data packet at least partially according to the forwarding path built at step 630. For example, the PCC may transmit the data packet over a link, hop, and/or using a label and/or interface indicated in the forwarding path built at step 630.

Figure 7:
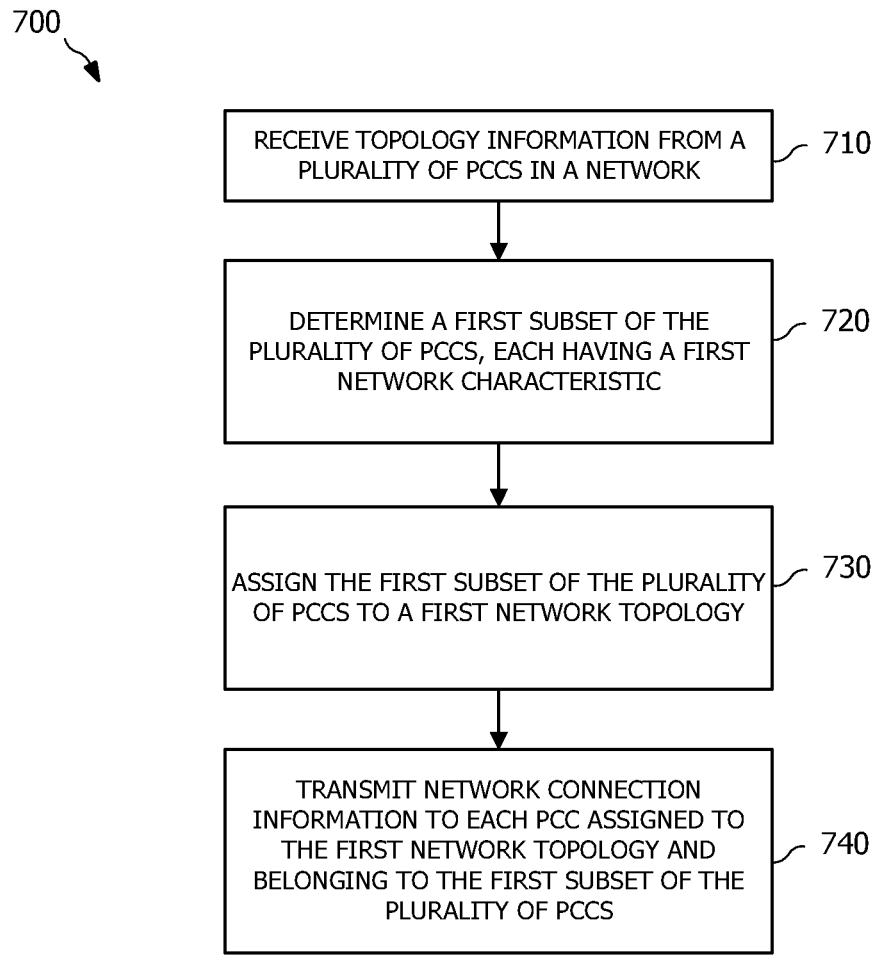
FIG. 7 is a flowchart of an embodiment of a method for communication by a PCECC.

Referring now to FIG. 7, a flowchart of an embodiment of a method 700 for communication by a PCECC is shown. The method 700 is implemented by a PCECC in an SDN, for example, the PCECC 310 in the SDN 300, both of FIG. 3, when the PCECC wishes to categorize or slice a network, for example the network 350, also of FIG. 3, into one or more slices or groups of the network, each of which may be designated by, or referred to as, a color. At step 710, the PCECC receives topology information from a plurality of PCCs (e.g., the PCCs 320 of FIG. 3). The topology information includes, for example, network characteristics which each respective PCC is capable of supporting (e.g., a prescribed minimum bandwidth, reliability, QoS, delay, level of security, or other network criteria or metric). The topology information further includes, for example, connections and accesses, labels, and/or interfaces of, or associated with, the respective PCCs. At step 720, the PCECC determines a first subset of the plurality of PCCs, where each PCC in the first subset has a first network characteristic (e.g., a shared network characteristic). The PCECC determines the first subset of the plurality of PCCs, for example, by categorizing the PCCs in the network into one or more groups based at least in part on the topology information received from the PCCs at step 710. For example, the PCECC may categorize the PCCs into groups having a certain available bandwidth, QoS, reliability, delay, and/or groups having a minimum number of PCCs in common among the groups. The PCECC may categorize the PCCs into the groups in response to receiving a request message to route data through the network, where the request message indicates a minimum level of one or more of the network characteristics. At step 730, the PCECC assigns the first subset of the plurality of PCCs to a first network topology. The PCECC assigns the first subset of the plurality of PCCs to the first network topology, for example, by assigning or associating a color with each PCC of the first subset of the plurality of PCCs. At step 740, the PCECC transmits network connection information (e.g., comprising the color, the first network topology, and/or other network information) to at least some of the PCCs in the network (e.g., to each PCC assigned to the first network topology and belonging to the first subset of the plurality of PCCs). For example, the PCECC may transmit the network connection information only to PCCs included in a particular group determined at step 720, or may transmit the network connection information to all of the PCCs in the network. The network connection information may indicate to at least some of the PCCs (e.g., PCCs included in one or more of the groups determined at step 720) routing information for routing data packets selected for a topology defined by one of the groups. For example, the network connection information may include link, label, and/or interface information for routing data packets between PCCs belonging to a same group.

Figure 8:
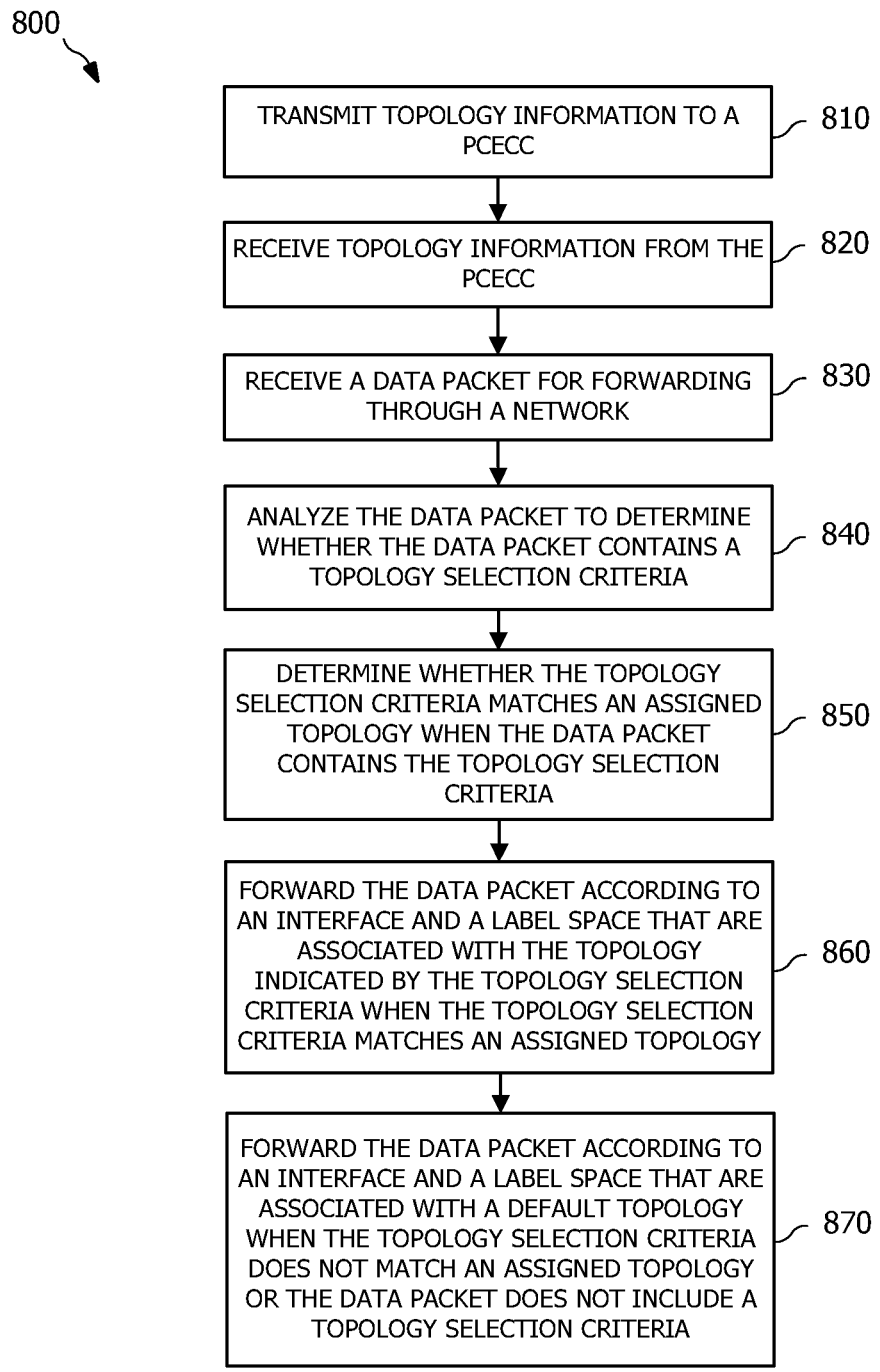
FIG. 8 is a flowchart of an embodiment of a method for communication by a PCC.

Referring now to FIG. 8, a flowchart of a method 800 for communication by a PCC is shown. The method 800 is implemented by a PCC in an SDN, for example, any one of the PCCs 320 in the SDN 300, each of FIG. 3, when the PCC receives a data packet for routing through a network. At step 810, the PCC transmits topology information to a PCECC such as the PCECC 310 of FIG. 3. The topology information includes, for example, network characteristics that the PCC is capable of supporting (e.g., a prescribed minimum bandwidth, reliability, QoS, delay, level of security, or other network criteria or metric). The topology information further includes, for example, connections and accesses, labels, and/or interfaces of, or associated with, the PCC. In some embodiments, transmitting the topology information to the PCECC may be in response to communications received from the PCECC (e.g., a request message) and/or establishment of a relationship between the PCECC and the PCC (e.g., a parent-child PCEP relationship). At step 820, the PCC receives topology information from the PCECC. The topology information received from the PCECC, in some embodiments, assigns the PCC to one or more slices or colors of the network, each of which may be designated by, or indicated as, a color. The topology information received from the PCECC, in some embodiments, includes an interface and/or a label space for use by the PCC in forwarding data packets to other PCCs of the same color. The topology information received from the PCECC may assign the PCC to no group or color, to a single group or color, or to a plurality of groups or colors.

At step 830, the PCC receives a data packet for forwarding through the network. The data packet is received by the PCC, for example, from a device outside of the network (e.g., when the PCC is an ingress or edge node of the network) or from another PCC within the network. At step 840, the PCC analyzes the data packet to determine whether the data packet contains a topology selection criteria. The topology selection criteria, in some embodiments, specifies a particular topology color for forwarding the data packet through the network. At step 850, when the data packet contains the topology selection criteria, the PCC determines whether the PCC is assigned to a topology matching the topology selection criteria. For example, the PCC may be assigned to green, blue, and red topologies and may determine whether the topology selection criteria matches one of the green, blue, or red topologies. At step 860, when the topology selection criteria matches a topology to which the PCC is assigned, the PCC forwards the data packet according to an interface of the PCC and a label space that are each associated with the topology indicated by the topology selection criteria. At step 870, when the data packet does not include a topology selection criteria, and/or when the topology selection criteria does not match a topology to which the PCC is assigned, the PCC forwards the data packet according to an interface of the PCC and a label space that are each associated with a default topology of the network.

Figure 9:
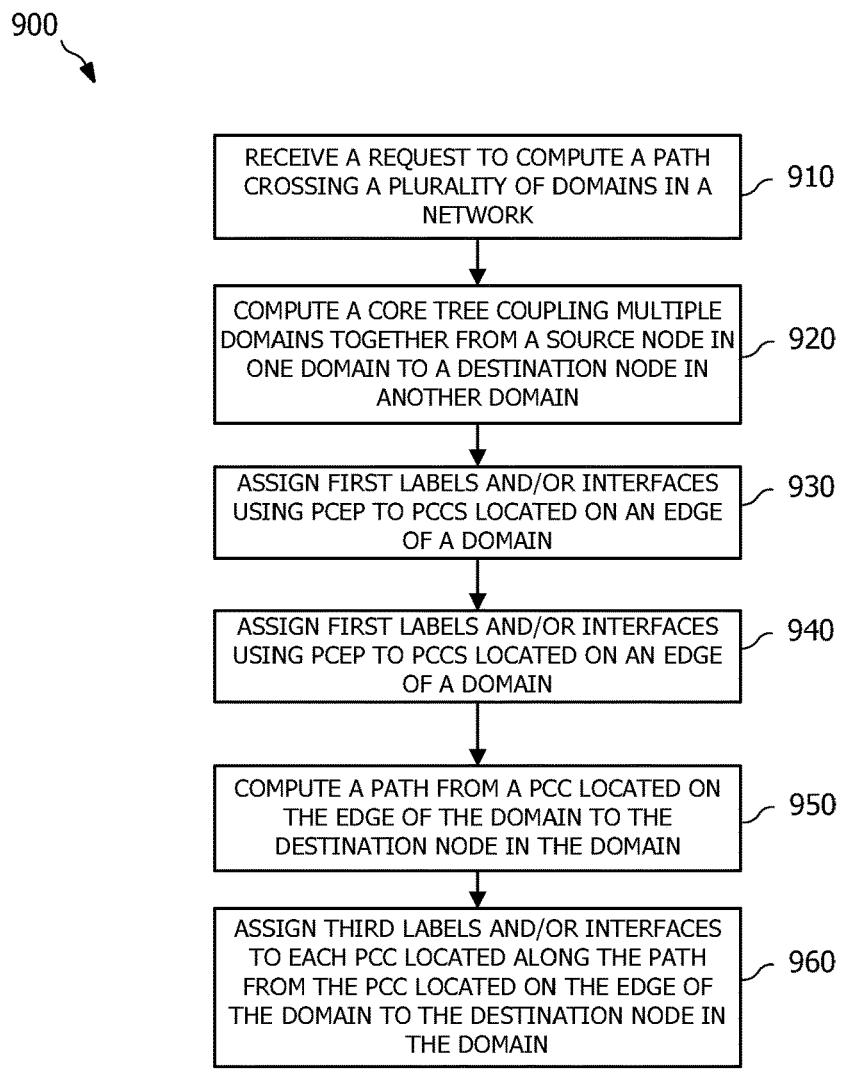
FIG. 9 is a flowchart of an embodiment of a method for communication by a PCECC.

Referring now to FIG. 9, a flowchart of an embodiment of a method 900 for communication by a PCECC is shown. The method 900 is implemented by a PCECC in an SDN, for example, any one of the PCECCs 410A-410F in the SDN 400, each of FIG. 4, when the PCECC wishes to assign labels and interfaces for routing data between domains such as the domains 430A-430F, also of FIG. 4. At step 910, the PCECC receives a request to compute a path crossing multiple (e.g., a plurality of) domains. At step 920, the PCECC computes a core tree coupling the domains together from a source node in one domain (e.g., a PCC such as a PCC 420, also of FIG. 4) to a destination node (e.g., another PCC) in another domain. The core tree is computed, for example, as described in International Patent Application No. PCT/US2010/024577, entitled "System and Method for Point to Multipoint Inter-domain Multiprotocol Label Switching Traffic Engineering Path Calculation," and discussed above with respect to FIG. 4.

At step 930, the PCECC assigns first labels and/or interfaces to PCCs located on an edge of a domain in which the PCECC is located and/or with which the PCECC is associated. At step 940, the PCECC also assigns second labels and/or interfaces to PCCs located on an edge of a domain adjacent to the domain in which the PCECC is located and/or with which the PCECC is associated and to which the PCCs located on an edge of a domain in which the PCECC is located are communicatively coupled. In some embodiments, the PCECC assigns the labels and/or interfaces according to PCEP.

At step 950, the PCECC computes a path from the PCC located on an edge of the domain in which the PCECC is located and/or with which the PCECC is associated to the destination node in the domain in which the PCECC is located and/or with which the PCECC is associated, for example, as described in International Patent Application No. PCT/US2010/024577, entitled "System and Method for Point to Multipoint Inter-domain Multiprotocol Label Switching Traffic Engineering Path Calculation," and discussed above with respect to FIG. 4. At step 960, the PCECC assigns labels and/or interfaces to each PCC located along a path from the PCC located on the edge of the domain in which the PCECC is located and/or with which the PCECC is associated to the destination node in the domain in which the PCECC is located and/or with which the PCECC is associated. In some embodiments, the PCECC assigns the labels and/or interfaces according to PCEP.

Figure 10:
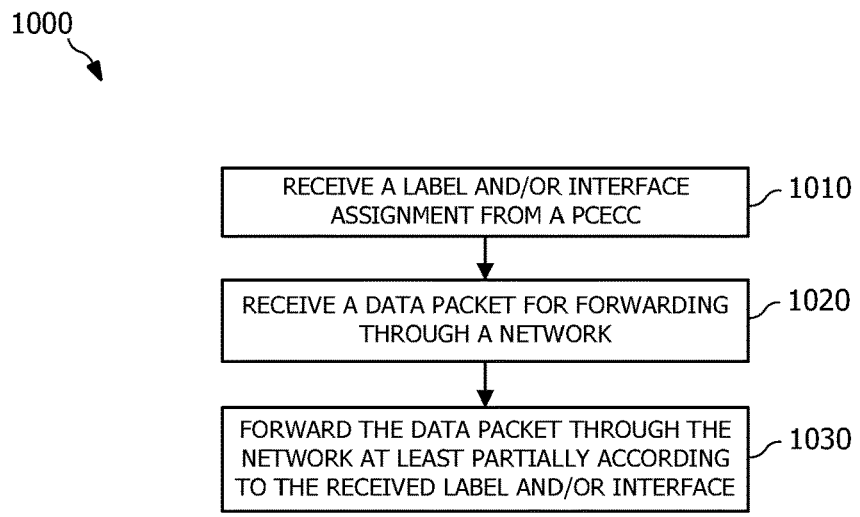
FIG. 10 is a flowchart of an embodiment of a method for communication by a PCC.

Referring now to FIG. 10, a flowchart of a method 1000 for communication by a PCC is shown. The method 1000 is implemented by a PCC in an SDN, for example, any one of the PCCs 420 in the SDN 400, each of FIG. 4, when the PCC receives a data packet for routing through a network. At step 1010, the PCC receives a label and/or interface assignment from a PCECC, for example, any one of the PCECC 410A-410F of FIG. 4. The label and/or interface is received, for example, according to PCEP. In some embodiments, the label and/or interface is received by the PCC based on a core tree and/or path through the network computed at least in part by the PCECC. At step 1020, the PCC receives a data packet. The data packet is received by the PCC, for example, from a device outside of the network (e.g., when the PCC is an ingress or edge node of the network) or from another PCC within the network. At step 1030, the PCC forwards the data packet at least partially according to the label and/or interface received from the PCECC at step 1010.

It should be noted that for each of the methods disclosed herein, the methods may include additional steps that are not recited herein, any one or more of the steps recited herein may include one or more sub-steps, any one or more of the steps recited herein may be omitted, and/or any one or more of the step recited herein may be performed in an order other than that presented herein (e.g., in a reverse order, substantially simultaneously, overlapping, etc.), all of which is intended to fall within the scope of the present disclosure.

It should further be noted that communication among PCEP network elements (e.g., a PCECC and a PCC, a PCC and a PCECC, a PCC and another PCC, a PCECC and another PCECC, and/or an outside device and either a PCECC or a PCC) may be performed using presently existing communication messages, or communications messages which are yet to be defined. In some embodiments, the communication among PCEP network elements is performed according to newly defined type-length-value (TLV) elements that are included in presently existing PCEP communication messages (e.g., path computation request, path computation reply, connections and accesses advertisement, etc.). In other embodiments, the communication among PCEP network elements is performed according to newly defined PCEP communication messages which may include existing and/or newly defined TLVs. Thus, a particular type of a PCEP message and/or TLV in a PCEP message that carries and/or facilitates communications according to the present disclosure is not limited herein.

Figure 11:
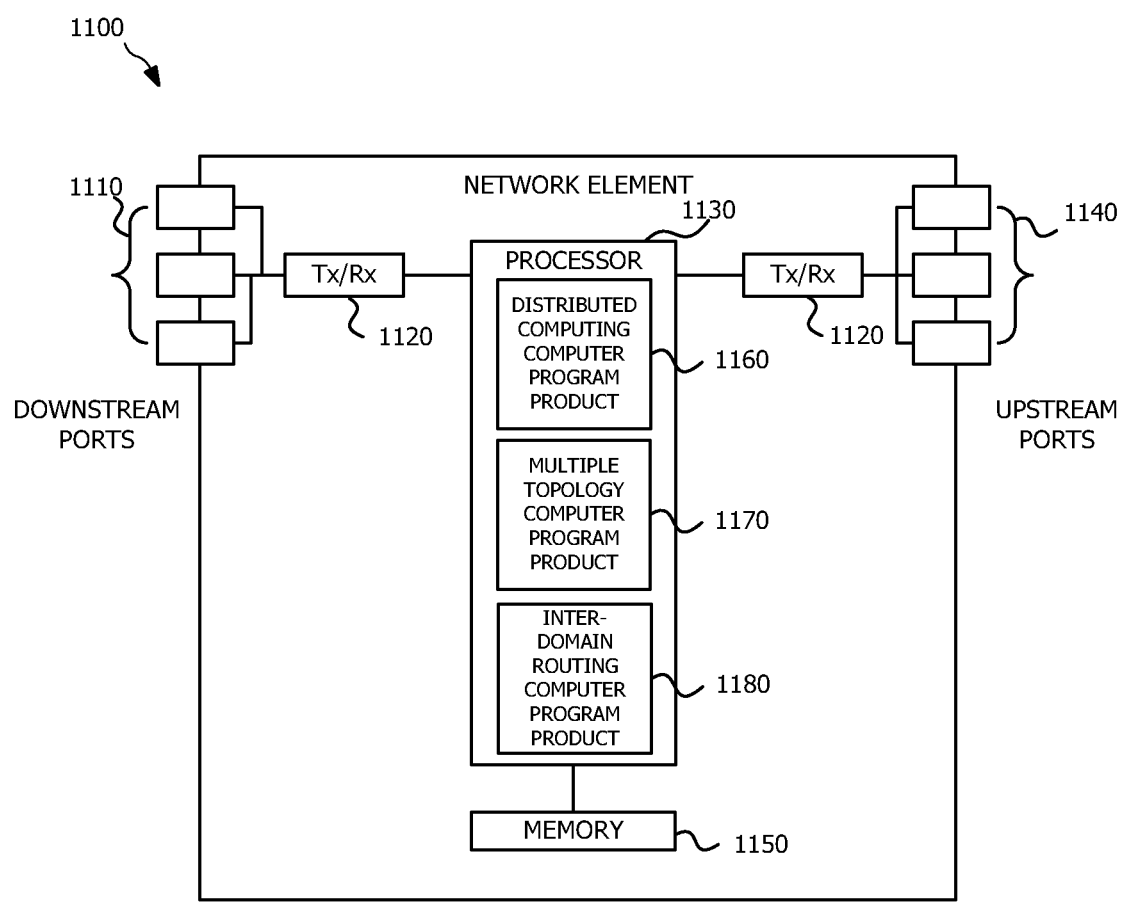
FIG. 11 is a schematic diagram of a network element according to various embodiments of the present disclosure.

Referring now to FIG. 11, a schematic diagram of a network element 1100 according to various embodiments is shown. Network element 1100 may be any suitable processing device capable of performing the functions disclosed herein such as a PCEP network element and/or controller capable of operation within a PCE architecture and/or a SDN such as the SDN 100, SDN 300, and/or SDN 400. For example, the network element 1100 is suitable for implementation as a PCECC 120, a PCECC 310, any one or more of the PCECCs 410-410F, and/or any one or more of the PCCs 130, 320, or 420, each as discussed above in conjunction with their respective figures. Network element 1100 is configured to implement at least some of the features/methods disclosed herein, communicate according to at least some of the protocol diagrams disclosed herein, and/or transmit or receive any one or more of the messages and/or objects disclosed herein. In various embodiments, for instance, the features/methods of this disclosure are implemented using hardware, firmware, and/or software installed to run on hardware. For example, in various embodiments, the network element 1100 is configured to implement any one or more of communication according to the protocol diagram 200, and/or any one or more of the methods 500, 600, 700, 800, 900, or 1000.

Network element 1100 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions.

The network element 1100 comprises one or more downstream ports 1110 coupled to a transceiver (Tx/Rx) 1120, which are transmitters, receivers, or combinations thereof. The Tx/Rx 1120 transmits and/or receives frames from other network elements via the downstream ports 1110. Similarly, the network element 1100 comprises another Tx/Rx 1120 coupled to a plurality of upstream ports 1140, wherein the Tx/Rx 1120 transmits and/or receives frames from other nodes via the upstream ports 1140. The downstream ports 1110 and/or the upstream ports 1140 may include electrical and/or optical transmitting and/or receiving components. In another embodiment, the network element 1100 comprises one or more antennas (not shown) coupled to the Tx/Rx 1120. The Tx/Rx 1120 transmits and/or receives data (e.g., packets) from other computing or storage devices wirelessly via the one or more antennas.

A processor 1130 is coupled to the Tx/Rx 1120 and is configured to communicate using PCEP according to at least some of the embodiments disclosed herein. In an embodiment, the processor 1130 comprises one or more multi-core processors and/or memory modules 1150, which functions as data stores, buffers, etc. The processor 1130 is implemented as a general processor or as part of one or more application specific integrated circuits (ASICs), field-programmable gate arrays (FPGAs), and/or digital signal processors (DSPs). Although illustrated as a single processor, the processor 1130 is not so limited and alternatively comprises multiple processors. The processor 1130 further comprises processing logic configured to execute a distributed computing computer program product 1160 that is configured to perform computational tasks associated with computing a path through a network using a network element configured as both a PCE and a PCC (e.g., by implementing communications according to at least some of the protocol diagram 200 and/or implementing at least some of the methods 500 or 600), a multiple topology computer program product 1170 that is configured to facilitate communication in a network having multiple topologies (e.g., by implementing at least some of the methods 700 or 800), and/or an inter-domain routing computer program product 1180 that is configured to facilitate communication among multiple domains in an SDN (e.g., by implementing at least some of the methods 900 or 1000).

FIG. 11 also illustrates that a memory module 1150 is coupled to the processor 1130 and is a non-transitory medium configured to store various types of data. Memory module 1150 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 1150 may be used to house the instructions for carrying out the various embodiments described herein. For example, the memory module 1150 may comprise the distributed computing computer program product 1160, the multiple topology computer program product 1170, and/or the inter-domain routing computer program product, each of which is executed by the processor 1130.

It is understood that by programming and/or loading executable instructions onto the network element 1100, at least one of the processor 1130 and/or the memory module 1150 are changed, transforming the network element 1100 in part into a particular machine or apparatus, for example, a PCECC and/or PCC having at least the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Disclosed herein is a PCECC, in some embodiments, comprising a means for receiving a request to compute a path through a network, the request comprising a plurality of computational tasks, dividing the computational tasks into a plurality of groups of computational tasks, transmitting at least some of the plurality of groups of computational tasks to a plurality of PCCs for computation by the PCCs, and receiving, from the PCCs, computation results corresponding to the plurality of groups of computational tasks. In some embodiments, the PCECC additionally, or alternatively, comprises means for receiving, from a plurality of PCCs, network topology information of each of the plurality of PCCs, determining, according to the network topology information, a first subset of the plurality of PCCs, each having a first network characteristic, assigning the first subset of the plurality of PCCs to a first network topology, and transmitting network connection information to each PCC assigned to the first network topology and belonging to the first subset of the plurality of PCCs. In some embodiments, the PCECC additionally, or alternatively, comprises means for receiving a request to compute a path crossing a plurality of domains in a network, computing a core tree coupling the plurality of domains, assigning a first MPLS label space and an outgoing interface using PCEP to a first edge node of a first domain associated with the PCECC, and assigning a second MPLS label space and an incoming interface using PCEP to a second edge node of a second domain that is coupled to the first edge node of the first domain.

Additional embodiments are cited in the following clauses.

Clause 1. A path computation element (PCE) central controller (PCECC) comprising:

a memory comprising executable instructions; and a processor coupled to the memory and configured to execute the instructions, wherein executing the instructions causes the processor to:

receive a request to compute a path through a network, the request comprising a plurality of computational tasks;

divide the computational tasks into a plurality of groups of computational tasks;

transmit at least some of the plurality of groups of computational tasks to a plurality of path computation clients (PCCs) for computation by the PCCs; and receive, from the PCCs, computation results corresponding to the plurality of groups of computational tasks.

Clause 2. The PCECC of clause 1, wherein the PCECC transmits the at least some of the plurality of groups of computational tasks to first PCCs configured in a dual operation mode as a PCC and as a PCE.

Clause 3. The PCECC of any of clauses 1-2, wherein the processor further performs first computational tasks corresponding to one of the plurality of groups of computational tasks.

Clause 4. The PCECC of any of clauses 1-3, wherein the processor further:

computes an optimized path through the network according to the results received from the PCCs; and transmits forwarding information corresponding to the optimized path to at least some of the PCCs.

Clause 5. The PCECC of any of clauses 1-4, wherein the processor further:

receives forwarding entry information from at least some of the PCCs; and updates a database of routing information with the received forwarding entry information.

Clause 6. The PCECC of any of clauses 1-5, wherein the PCECC receives the request to compute the path through the network from one of the plurality of PCCs.

Clause 7. The PCECC of any of clauses 1-6, wherein the PCECC is configured in a dual operation mode as a PCE and as a PCC.

Clause 8. A path computation element (PCE) central controller (PCECC) comprising:

a memory comprising executable instructions; and a processor coupled to the memory and configured to execute the instructions, wherein executing the instructions causes the processor to:

receive, from a plurality of path computation clients (PCCs), network topology information of each of the plurality of PCCs;

determine, according to the network topology information, a first subset of the plurality of PCCs, each having a first network characteristic;

assign the first subset of the plurality of PCCs to a first network topology; and transmit network connection information to each PCC assigned to the first network topology and belonging to the first subset of the plurality of PCCs.

Clause 9. The PCECC of clause 8, wherein the network connection information comprises a multiprotocol label switching (MPLS) label space and an outgoing interface of a respective PCC receiving the network connection information.

Clause 10. The PCECC of any of clauses 8-9, wherein the processor determines the first subset of the plurality of PCCs and assigns the first subset of the plurality of PCCs to the first network topology in response to receiving a request to determine a path through a network in which the plurality of PCCs are located.

Clause 11. The PCECC of any of clauses 8-10, wherein the processor further:

determines, according to the network topology information, a second subset of the plurality of PCCs, each having a second network characteristic;

assigns the second subset of the plurality of PCCs to a second network topology; and transmits network connection information to each PCC assigned to the second network topology and belonging to the second subset of the plurality of PCCs.

Clause 12. The PCECC of any of clauses 8-11, wherein the first network topology services a first network service, and wherein the second network topology services a second network service separately from the first network service.

Clause 13. The PCECC of any of clauses 8-12, wherein a first PCC belonging to the first subset of the plurality of PCCs belongs to the second subset of the plurality of PCCs.

Clause 14. The PCECC of any of clauses 8-13, wherein a second PCC belonging to the first subset of the plurality of PCCs does not belong to the second subset of the plurality of PCCs.

Clause 15. The PCECC of any of clauses 8-14, wherein the first network characteristic is selected from a group consisting of bandwidth, quality of service (QoS), service type, delay, and reliability.

Clause 16. A path computation element (PCE) central controller (PCECC) comprising:

a memory comprising executable instructions; and a processor coupled to the memory and configured to execute the instructions, wherein executing the instructions causes the processor to:

receive a request to compute a path crossing a plurality of domains in a network;

compute a core tree coupling the plurality of domains;

assign a first multiprotocol label switching (MPLS) label space and an outgoing interface using PCE communication protocol (PCEP) to a first edge node of a first domain associated with the PCECC; and assign a second MPLS label space and an incoming interface using PCEP to a second edge node of a second domain that is coupled to the first edge node of the first domain.

Clause 17. The PCECC of clause 16, wherein the processor further:

computes a path from the first edge node of the first domain to a destination located in the first domain, wherein the destination is indicated by the request to compute the path crossing the plurality of domains in the network, and wherein the path includes a plurality of internal nodes in the first domain; and assigns a third MPLS label space and an outgoing interface using PCEP to each of the plurality of internal nodes in the first domain.

Clause 18. The PCECC of any of clauses 15-17, wherein the first edge node, the second edge node, and the plurality of internal nodes are path computation clients (PCCs).

Clause 19. The PCECC of any of clauses 15-18, wherein the path crossing the plurality of domains in the network is a multicast path.

Clause 20. The PCECC of any of clauses 15-19, wherein the path crossing the plurality of domains in the network is a unicast path.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. The use of the term "about" means +/−10 percent of the subsequent number, unless otherwise stated. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A path computation element (PCE) central controller (PCECC) comprising:
    a memory comprising executable instructions; and
    a processor coupled to the memory and configured to execute the instructions, wherein executing the instructions causes the processor to:
        receive a request to compute a path through a network, the request comprising a plurality of path computational tasks for computing the path through the network;
        divide the plurality of path computational tasks for computing the path through the network into a plurality of groups of path computational tasks;
        transmit at least some of the plurality of groups of path computational tasks for computing the path through the network to a plurality of path computation clients (PCCs) for computation by the PCCs;
        receive, from the PCCs, computation results corresponding to the plurality of groups of path computational tasks for computing the path through the network; and
        compute, by the PCECC, the path through the network using the computation results corresponding to the plurality of groups of path computational tasks received from the PCCs.

2. The PCECC of claim 1, wherein the PCECC transmits the at least some of the plurality of groups of path computational tasks to first PCCs configured in a dual operation mode as a PCC and as a PCE.

3. The PCECC of claim 1, wherein the processor further performs first path computational tasks corresponding to one of the plurality of groups of path computational tasks.

4. The PCECC of claim 1, wherein the processor further: transmits forwarding information corresponding to the path to at least some of the PCCs.

5. The PCECC of claim 4, wherein the processor further: receives forwarding entry information from at least some of the PCCs; and
    updates a database of routing information with the received forwarding entry information.

6. The PCECC of claim 1, wherein the PCECC receives the request to compute the path through the network from one of the plurality of PCCs.

7. The PCECC of claim 1, wherein the PCECC is configured in a dual operation mode as a PCE and as a PCC.

* * * * *